(12) United States Patent
Chen (10) Patent No.: US 7,302,000 B2
(45) Date of Patent: Nov. 27, 2007

(54) METHOD AND SYSTEM FOR TWO-PASS VIDEO ENCODING USING SLIDING WINDOWS

(75) Inventor: Yi-Kai Chen, Tainan (TW)

(73) Assignee: Ulead Systems, Inc., Taipei (TW)

( * ) Notice: Subject to any disclaimer, the term of this patent is extended or adjusted under 35 U.S.C. 154(b) by 594 days.

(21) Appl. No.: 10/828,199

(22) Filed: Apr. 21, 2004

(65) Prior Publication Data

US 2005/0226321 A1    Oct. 13, 2005

(30) Foreign Application Priority Data

Mar. 31, 2004    (JP)    ............................. 2004-103718

(51) Int. Cl.
*H04N 7/18*    (2006.01)
(52) U.S. Cl. ............................. 375/240.04; 375/240.05
(58) Field of Classification Search ............................... 375/240.01–240.29
See application file for complete search history.

(56) References Cited

U.S. PATENT DOCUMENTS

| | | | |
|---|---|---|---|
| 6,747,991 B1 * | 6/2004 | Hemy et al. ................ | 370/468 |
| 6,925,120 B2 * | 8/2005 | Zhang et al. .......... | 375/240.08 |
| 7,099,389 B1 * | 8/2006 | Yu et al. ................ | 375/240.12 |

OTHER PUBLICATIONS

Natwichai et al., Department of Computer Engineering, p. 1-6.
Mohsenian et al., IBM Journal, Jul. 4, 1999, vol. 43 No. 4 p. 489-492.

* cited by examiner

*Primary Examiner*—Andy S. Rao
(74) *Attorney, Agent, or Firm*—Birch, Stewart, Kolasch & Birch, LLP (57) ABSTRACT

A method for two-pass video encoding using sliding windows. The method receives a video sequence (VS), selects a portion of frames in the VS from the beginning as an analysis window, encodes each frame in the analysis window to acquire multiple statistical features, such as a bitrate to each frame in the analysis window, the quantization scale or complexity of the frame, redistributes the bitrate to each frame in the analysis window according to the statistical features, encodes the frames in the analysis window occurring between the beginning and an out point according to the redistributed bitrates, and selects a portion of frames in the VS from the next frame of the out point as a new analysis window if the VS is not completely encoded.

18 Claims, 6 Drawing Sheets

METHOD AND SYSTEM FOR TWO-PASS VIDEO ENCODING USING SLIDING WINDOWS

This Non-provisional application claims priority under 35 U.S.C. § 119(a) on Patent Application No(s). 2004-103718 filed in Japan on Mar. 31, 2004, the entire contents of which are hereby incorporated by reference.

BACKGROUND OF THE INVENTION

1. Field of the Invention

The present invention relates to video encoding technology; and particularly to a method and system for two-pass video encoding using sliding windows.

2. Description of the Related Art

A video sequence (VS) can be seen as a series of static frames, requiring considerable storage capacity and transmission bandwidth. A 90-min full color video stream, for example, having 640×480 pixels/frame and 15 frames/second, requires bandwidth of 640×480 (pixels/frame)×3 (bytes/pixel)×15 (frames/sec)=13.18 (MB/sec) and file size of 13.18 (MB/sec)×90×60=69.50 (GB). Such a sizeable digital video stream is difficult to store and transmit in real time, thus, many encoding techniques have been introduced.

MPEG standards ensure video encoders create standardized files that can be opened and played on any system with a standards-compliant decoder. Digital video contains spatial and temporal redundancies, which may be encoded without significant sacrifice. MPEG coding is a generic standard, intended to be independent of a specific application, involving encoding based on statistical redundancies in temporal and spatial directions. Spatial redundancy is based on the similarity in color values shared by adjacent pixels. MPEG employs intra-frame spatial encoding on redundant color values using DCT (Discrete Cosine Transform) and quantization. Temporal redundancy refers to identical temporal motion between video frames, providing smooth, realistic motion in video. MPEG relies on prediction, more precisely, motion-compensated prediction, for temporal encoding between frames. MPEG utilizes, to create temporal encoding, I-Frames, B-frames and P-frames. An I-frame is an intra-coded frame, a single image heading a sequence, with no reference to previous or subsequent frames. MPEG encodes only within the frame with no reference to previous or subsequent frames. P-frames are forward-predicted frames, encoded with reference to a previous I- or P-frame, with pointers to information in a previous frame. B-frames are encoded with reference to a previous reference frame, a subsequent reference frame, or both. Motion vectors employed may be forward, backward, or both.

MPEG achieves encoding by quantizing the coefficients produced by applying a DCT to 8×8 blocks of pixels in an image and through motion compensation. Quantization is basically division of the DCT coefficient by a quantization scale related to quality level, with higher indices for greater encoding but lower quality, and lower indices for the reverse.

Typical approaches for a MPEG video encoder utilize a constant bitrate (CBR) for a group of picture (GOP) regardless of the complexity of the video interval. Bitrate is used to represent video quality and defines how much physical space that one second of video takes in bits. They assume equal weighting of bit distribution among GOPs and reduce the degree of freedom of the encoding task. The CBR encoders enforce different quantizing scales for each frame type to achieve good quality streams within a GOP. The CBR method works adequately when the complexity of the source varies slowly over time and therefore the encoding algorithm has sufficient time to adjust itself. However, if the statistical features of the source change rapidly over time, a CBR operation may result in good frame quality for a short time window (e.g., a few frames or a GOP) and discontinuous quality when the whole video is acquired.

Since the VS is inherently variable, a better encoding approach has been introduced by employing a variable birate (VBR) encoder algorithm. Generally speaking, a VBR encoder produces non-constant output bitrate during a period of time, and a complex frame with a higher bitrate than that of a simple one. VBR encoder use the same or different quantization scales throughout the entire VS to achieve constant video quality.

Figure 1:
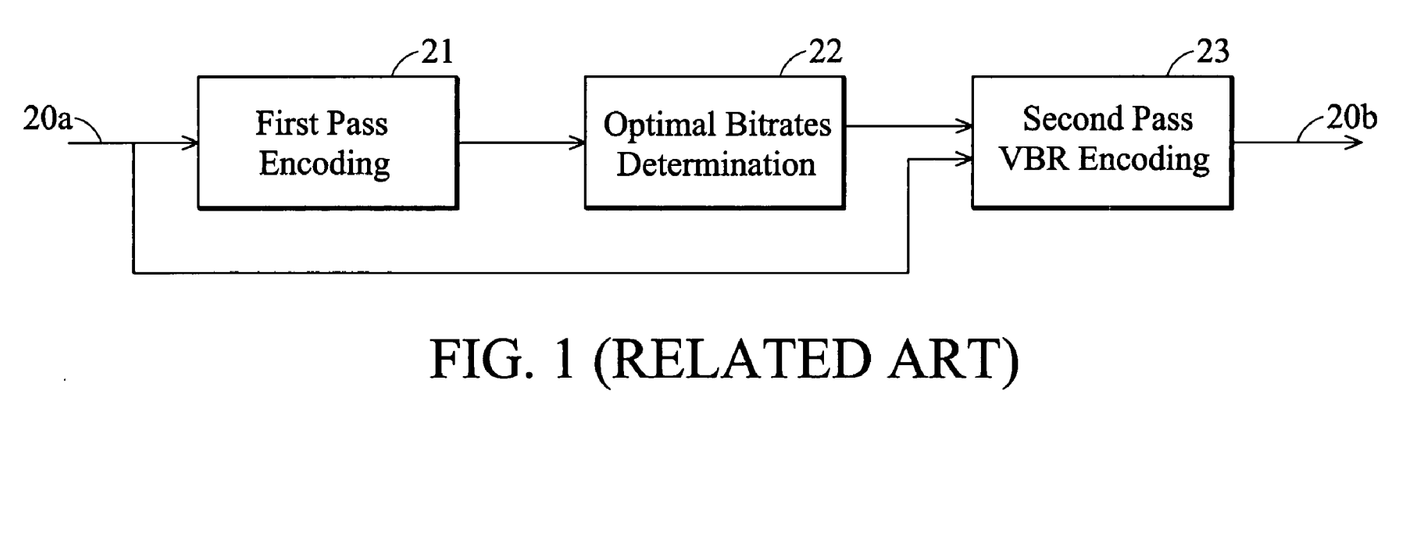
FIG. 1 is a schematic diagram of a conventional two-pass encoding method with variable bitrate (VBR)

Although the VBR algorithms are feasible for constant video quality, the distribution of bitrates may not be optimal for VS in only single pass. In order to allocate the given bitrate budget into different frames more properly, a rate-control scheme needs to redistribute bitrate for each frame in the entire VS properly under all possible quantization scales. Two-pass variable bitrate (VBR) technology has been introduced to achieve the above object. FIG. 1 is a schematic diagram of a conventional two-pass encoding method with VBR. The first pass encoding 21 encodes the entire source 20a to acquire the statistical features and then determines the optimal distribution of bitrates which satisfy requisite constraints. Thereafter, the second pass encoding 22 encodes the entire source 20a by the redistribution of bitrates according to the acquired statistical features and generates a VBR video stream 20b. It is noted that the encoded VS in the first pass is ignored and does not be carried into the second pass.

Although the solution is feasible, the entire two-pass encoding method with VBR is time intensive. Thus, the encoded result is acquired after completing entire two-pass encoding, resulting in hindering the requirement of quick response.

In view of the described limitations, a need exists for a system and method providing an efficient approach to satisfy the requirement of quick response.

SUMMARY OF THE INVENTION

It is therefore an object of the present invention to provide a system and method of two-pass video encoding using sliding windows to satisfy the requirement of quick response.

The present invention discloses a method comprising using a computer to receive a video sequence (VS), select a portion of frames in the VS from the beginning as an analysis window, encode each frame in the analysis window to acquire multiple statistical features, such as a bitrate to each frame in the analysis window, the quantization scale, complexity of the frame, or others, redistribute the bitrate to each frame in the analysis window according to the statistical features, encode the frames in the analysis window occurring between the beginning and an out point according to the redistributed bitrates, and select a portion of frames in the VS from the next frame of the out point as a new analysis window if the VS is not completely encoded.

The present invention further discloses a system for two-pass video encoding using sliding windows. The system comprises a sliding window control module, a statistical feature acquisition module, a bitrate redistribution module and a VBR encoding module. The sliding window control module receives a video sequence (VS), selects a portion of frames in the VS as an analysis window, selects a portion of frames from the analysis window occurring between the beginning and an out point as an encoded window, and selects a portion of frames in the VS from the next frame of the out point as a new analysis window if the VS is not completely encoded. The statistical feature acquisition module receives an analysis window, encodes the entire analysis window to acquire multiple statistical features for each frame in the analysis window. The bitrate redistribution module calculates a first bitrate for each frame in the analysis window according to the statistical features using a variable bitrate (VBR) distribution method. The VBR encoding module encodes the frames in the encoded window according to the first bitrates.

The present invention additionally discloses a computer-readable storage medium for storing a computer program which when executed performs the method of two-pass video encoding using sliding windows.

Preferably, the number of frames in the analysis window is larger than 900. The statistical features may comprise multiple quantization scales individually for a macro block (MB), and a second bitrate. The VBR distribution method may utilize an equation, $$BR2(i) = BR1(i) \times \sqrt{Qavg(i)} \times BRtarget \times Fwindow \div FR \div \sum_{j=1}^{Fwindow} (BR1(j) \times \sqrt{Qavg(j)}),$$

where $BR2(i)$ represents the second bitrate of the (i)th frame, $BR1(i)$ represents the first bitrate of the (i)th frame in the statistical features, $\sqrt{Qavg(i)}$ represents a square root of an average of the quantization scales for the (i)th frame in the statistical feature, BRtarget represents a predetermined target bitrate, Fwindow represents a sum of frames in the analysis window and FR represents a predetermined frame rate indicating how many frames that one second of video plays. Additionally, the out point may be located in the ½ to ¾ length of the analysis window from the beginning.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 2:
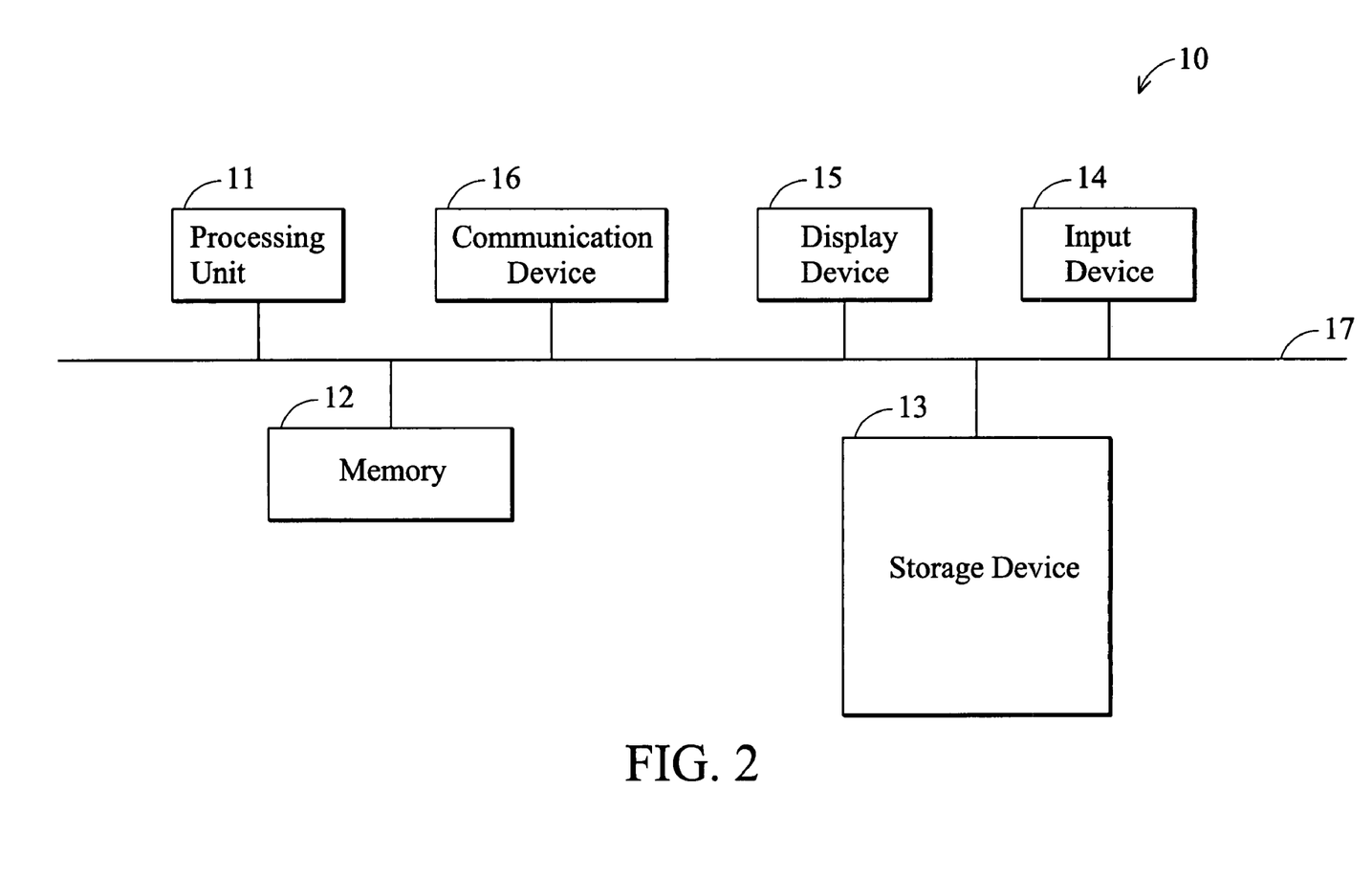
FIG. 2 is a diagram of the system architecture of the two-pass video encoding using sliding windows according to the present invention.

FIG. 2 is a diagram of the system architecture of the two-pass video encoding using sliding windows according to the present invention. The system 10 includes a processing unit 11, a memory 12, a storage device 13, an input device 14, a display device 15 and a communication device 16. The processing unit 11 is connected by buses 17 to the memory 12, storage device 13, input device 14, display device 15 and communication device 16 based on Von Neumann architecture. The processing unit 11, memory 12, storage device 13, display device 15, input device 14 and communication device 16 may be conventionally incorporated in a mainframe computer, a mini-computer, a workstation computer, a host computer, a personal computer, or a mobile computer.

The processing unit 11, controlled by instructions from the memory 12 and an operator through the input device 15, executes test time forecast functions. There may be only one or there may be more than one processing unit 11, such that the processor of computer 10 comprises a single central processing unit (CPU), or multiple processing units, commonly referred to as a parallel processing environment. The memory 12 is preferably a random access memory (RAM), but may also include read-only memory (ROM) or flash ROM. The memory 12 preferably includes a program module which includes routines, programs, objects, components, or others, for performing two-pass video encoding functions. The processing unit 11 performs the method of two-pass video encoding using sliding windows as shown in the following.

Figure 3:
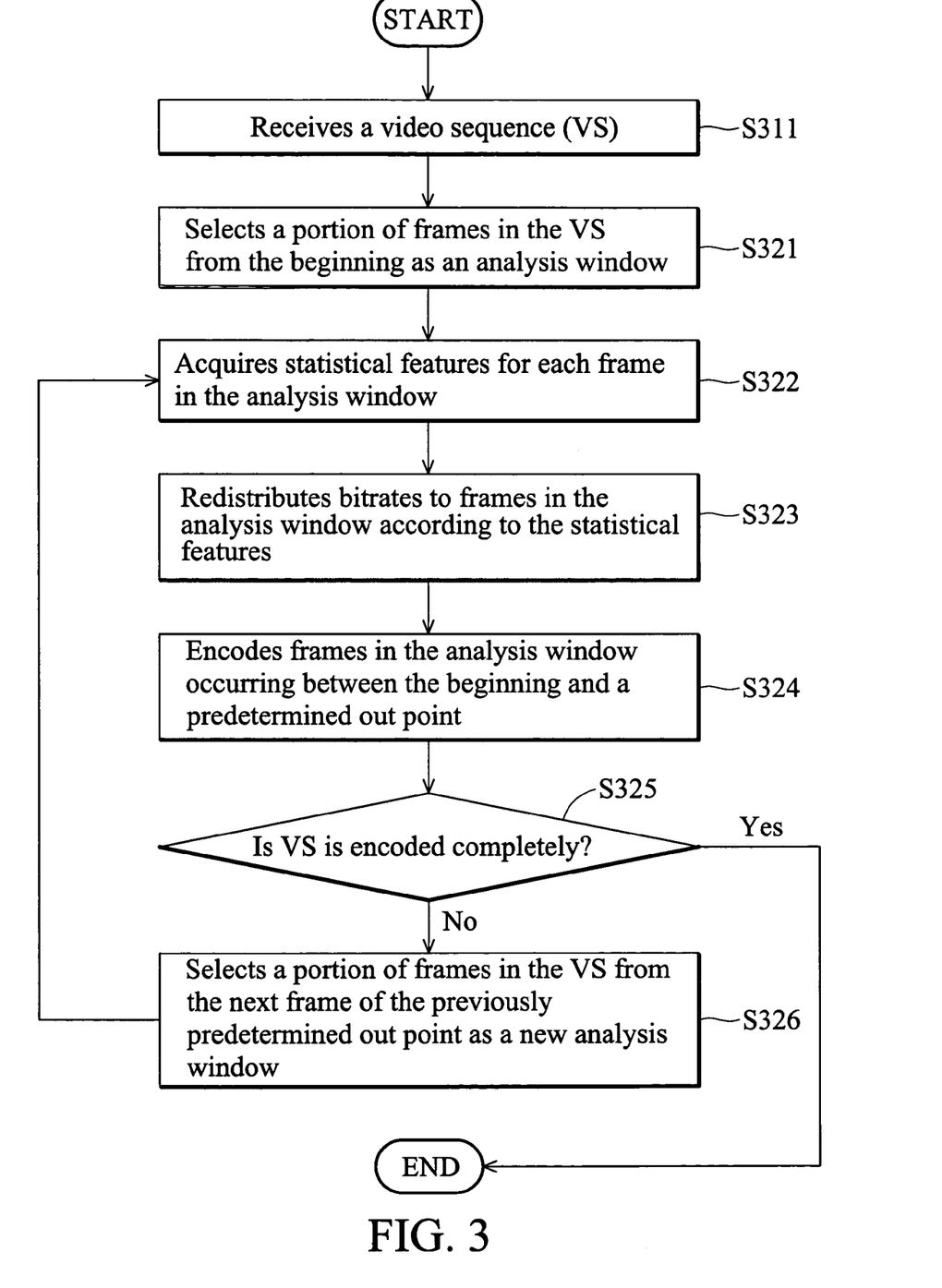
FIG. 3 is a flowchart showing the method of two-pass video encoding using sliding windows according to a preferred embodiment of the invention.

FIG. 3 illustrates a flowchart showing the method of two-pass video encoding using sliding windows according to a preferred embodiment of the invention. The method begins in step S311 to receive a video sequence (VS). In step S321, a portion of frames in the VS is selected from the beginning as an analysis window. In order to acquire sufficient frames for statistical feature calculation, the number of frames may larger than 900. Step 322 encodes each frame in the analysis window to acquire relevant statistical features, such as a bitrate to each frame in the analysis window, the quantization scale, complexity of the frame, or others. It is noted that the above encoding may use a constant bitrate (CBR) approach, a variable bitrate (VBR) approach, or others. Different scenes have different features, such as activities or motion, ranging from low activity and slow-motion scenes to high activity and fast-motion scenes, and the bitrate of VBR encoding should vary from one time to time. Thus, step S323 calculates (redistributes) bitrates to frames in the analysis window according to the calculated statistical features. Equation (1) shows an exemplary formula for recalculating bitrate for a particular frame.

Equation (1): $BR2(i) = BR1(i) \times \sqrt{Qavg(i)} \times$ $$BRtarget \times Fwindow \div FR \div \sum_{j=1}^{Fwindow} (BR1(j) \times \sqrt{Qavg(j)}),$$

where $BR2(i)$ represents the bitrate of (i)th frame, $BR1(i)$ represents the bitrate of (i)th frame calculated in step S322, $\sqrt{Qavg(i)}$ is the square root of the average of quantization scales in (i)th frame calculated in step S322, BRtarget represents the predetermined target bitrate, Fwindow represents the sum of frames in the analysis window and FR represents the predetermined frame rate indicating how many frames that one second of video plays. It is noted that bitrate recalculation formula is not limited to equation (1), being available as well as other well-known bitrate redistribution algorithms. Such bitrates re-distribution enables high-complexity frames with larger bitrate than that of low-complexity frames. Step S324 encodes frames in the analysis window occurring between the beginning and a predetermined out point according to the distribution of bitrates. The predetermined out point is preferably located in the ½ to ¾ length of the analysis window from the beginning. Step S325 determines whether the video sequence is encoded completely, if so, the process ends; and otherwise, the process proceeds to the step S326. Step S326 selects a portion of frames in the VS from the next frame of the previously predetermined out point as a new analysis window. The sum of frames in the new analysis window may equal to or differ from that in the previous analysis window depending on various implementation requirements. Thus, the new analysis window overlaps certain frames of the previous analysis window for new statistical feature calculation. If there is no overlap between the previous analysis window and the new one, the discontinuity quality is obvious particularly when those windows correspond to different scenes. Although the order of the method has been described in the preferred embodiment, it is not intended to limit the method to the precise order disclosed herein. Those skilled in the art can perform variations without departing from the scope and spirit of this invention.

Figure 4:
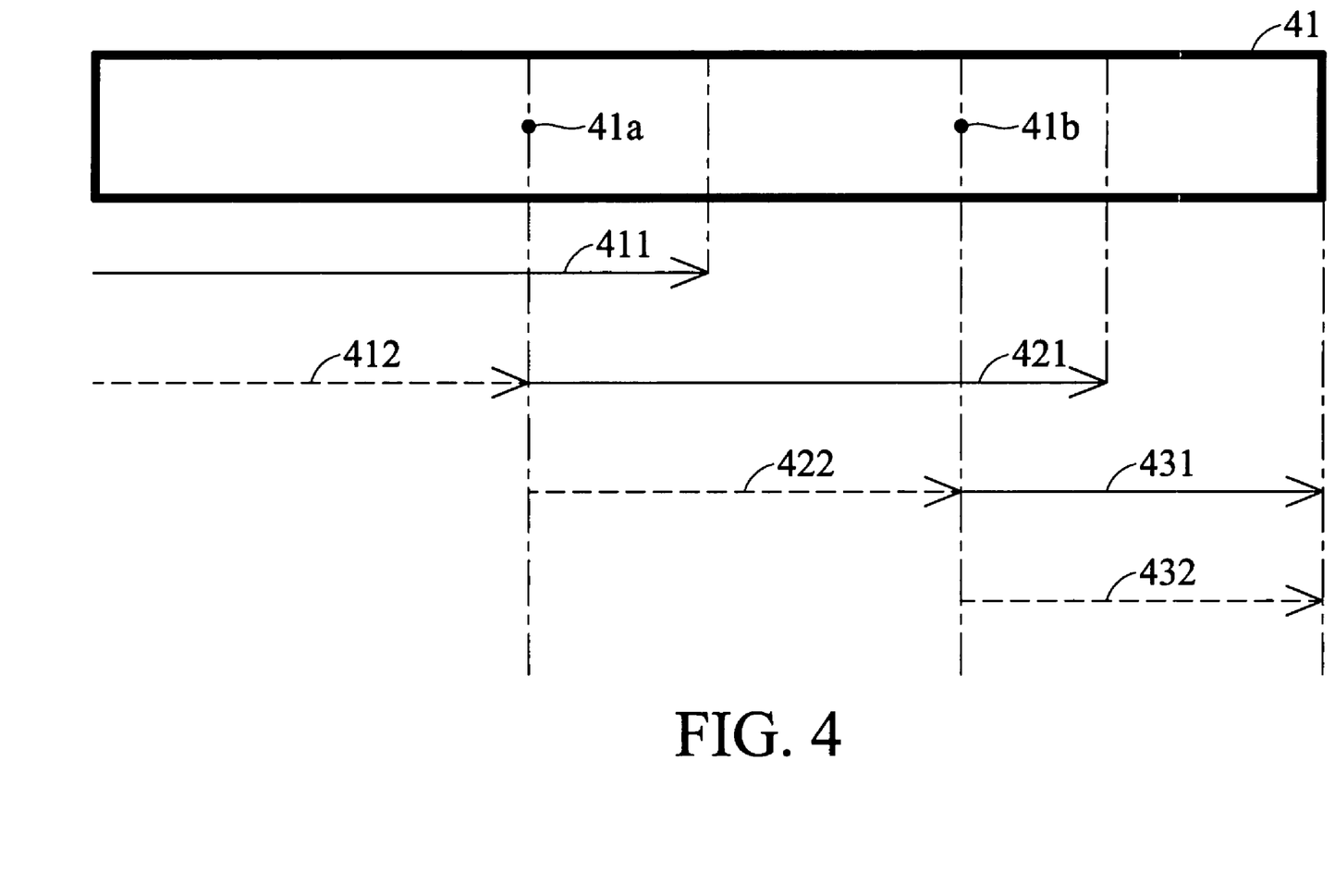
FIG. 4 is an exemplary encoding sequence diagram according to the preferred embodiment of the invention.

FIG. 4 is an exemplary encoding sequence diagram according to the preferred embodiment of the invention. In the beginning, A VS 41 is received. Referring to steps S322 to S323, the process selects a portion of frames in the VS 41 from the beginning as a first window (as shown in line 411), encodes each frame in the first window to acquire the statistical features, and accordingly redistributes bitrate to each frame therein. Referring to step S324, the process encodes frames in the first window occurring between the beginning and a predetermined out point 41a (as shown in dotted line 412) according to the redistribution of bitrates. Thereafter, referring to steps S325 to S326, the process selects a portion of frames in the VS 41 from the next frame of the previously predetermined out point 41a as a second window (as shown in line 421) for bitrate redistribution. Similarly, referring to steps S322 to S324, the process encodes frames in the second window occurring between the beginning and a predetermined out point 41b (as shown in dotted line 422). Finally, referring to steps S325 to S326, the process selects a portion of frames in the VS 41 from the next frame of the previously predetermined out point 41b as a third window (as shown in line 431) for bitrate redistribution. Similarly, referring to steps S322 to S324, the process encodes frames in the third window occurring between the beginning and the end (as shown in dotted line 432). It is noted that the encoded frames in the first pass are ignored and do not be carried into the second pass.

Figure 5:
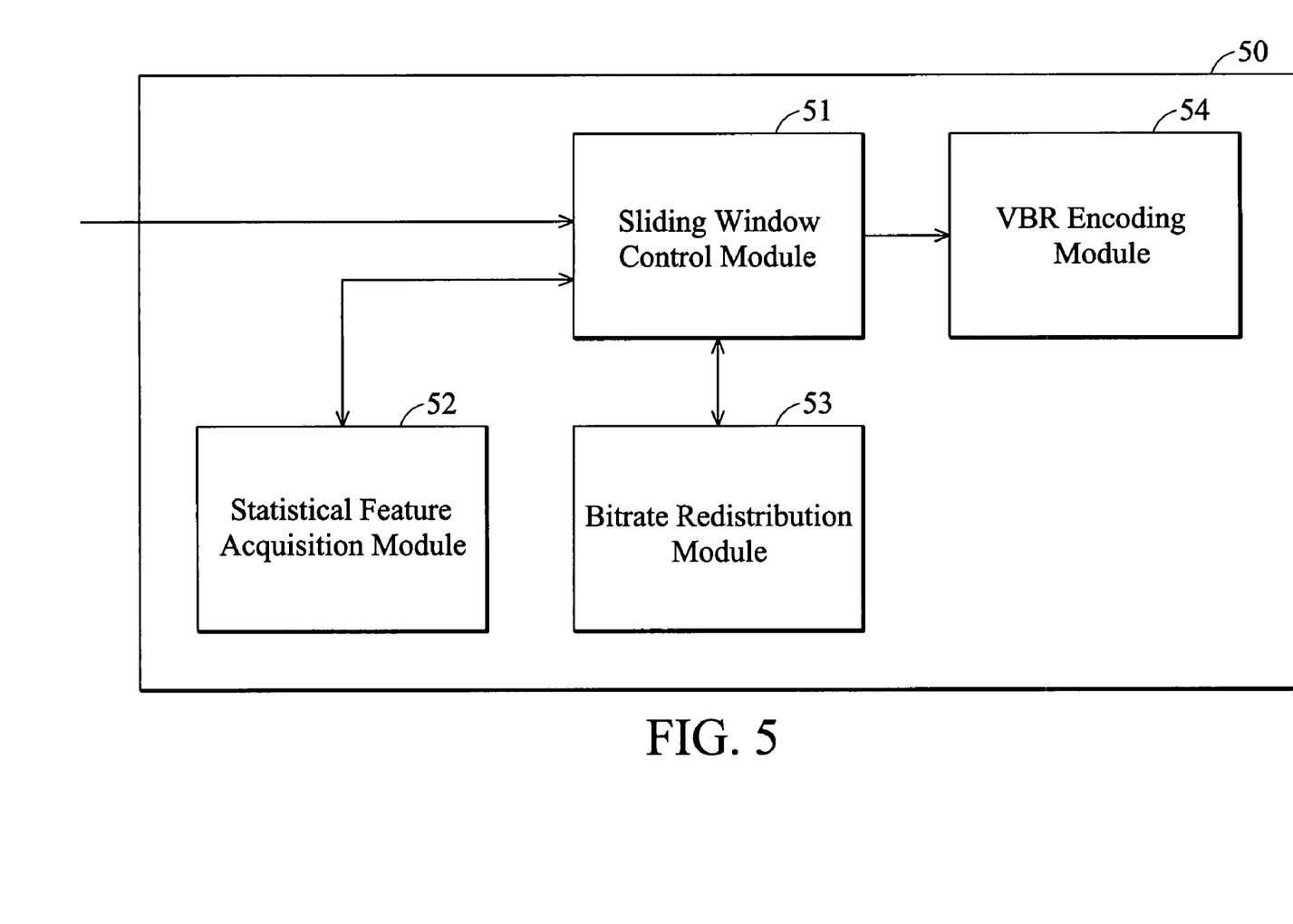
FIG. 5 is a system block diagram of two-pass video encoding using sliding windows according to the preferred embodiment of the invention.

The present invention further discloses a two-pass video encoding system using sliding windows. FIG. 5 is a system block diagram of two-pass video encoding using sliding windows according to the preferred embodiment of the invention. The system 50 preferably comprises a sliding window control module 51, a statistical feature acquisition module 52, a bitrate redistribution module 53 and a VBR encoding module 54. It is noted that the system 50 may be implemented in a computer program for execution by the processing unit 11, a chip, a chipset, or other electronic circuits. The sliding window control module 51 receives a VS, selects a portion of frames in the VS as an analysis window and transmits the analysis window to the statistical feature calculation module 52. The statistical feature acquisition module 52 receives the analysis window, encodes each frame in the analysis window to acquire statistical features, such as the quantization scales in MBs, bitrate or others, and transmits the statistical features of frames to the sliding window control module 51. It is noted that the above encoding may use a CBR approach, a VBR approach, or others. The sliding window control module 51 subsequently transmits the statistical features of frames to the bitrate redistribution module 53. The bitrate redistribution module 53 receives the statistical features of frames and accordingly recalculates bitrate for each frame, and transmits the new calculated bitrates to the sliding window control module 51. The bitrate recalculation formula is not limited to equation (1), being available as well as other well-known VBR algorithms. The sliding window control module 51 selects frames from the analysis window occurring between the beginning and a predetermined out point, and transmits the selected frames with recalculated bitrates thereof to the VBR encoding module 54. The predetermined out point is preferably located in the ½ to ¾ length of the analysis window from the beginning. The VBR encoding module 54 receives the frames and bitrates thereof and accordingly encodes the received frames to a VBR encoding video stream. The sliding window control module 51 subsequently selects a portion of frames in the VS from the next frame of the previously predetermined out point as a new analysis window. It is noted that the new analysis window selection performed by the sliding window control module 51 and the frame encoding performed by the VBR encoding module 54 may be operated simultaneously. The remaining operations among modules may be deduced by analogy.

Figure 6:
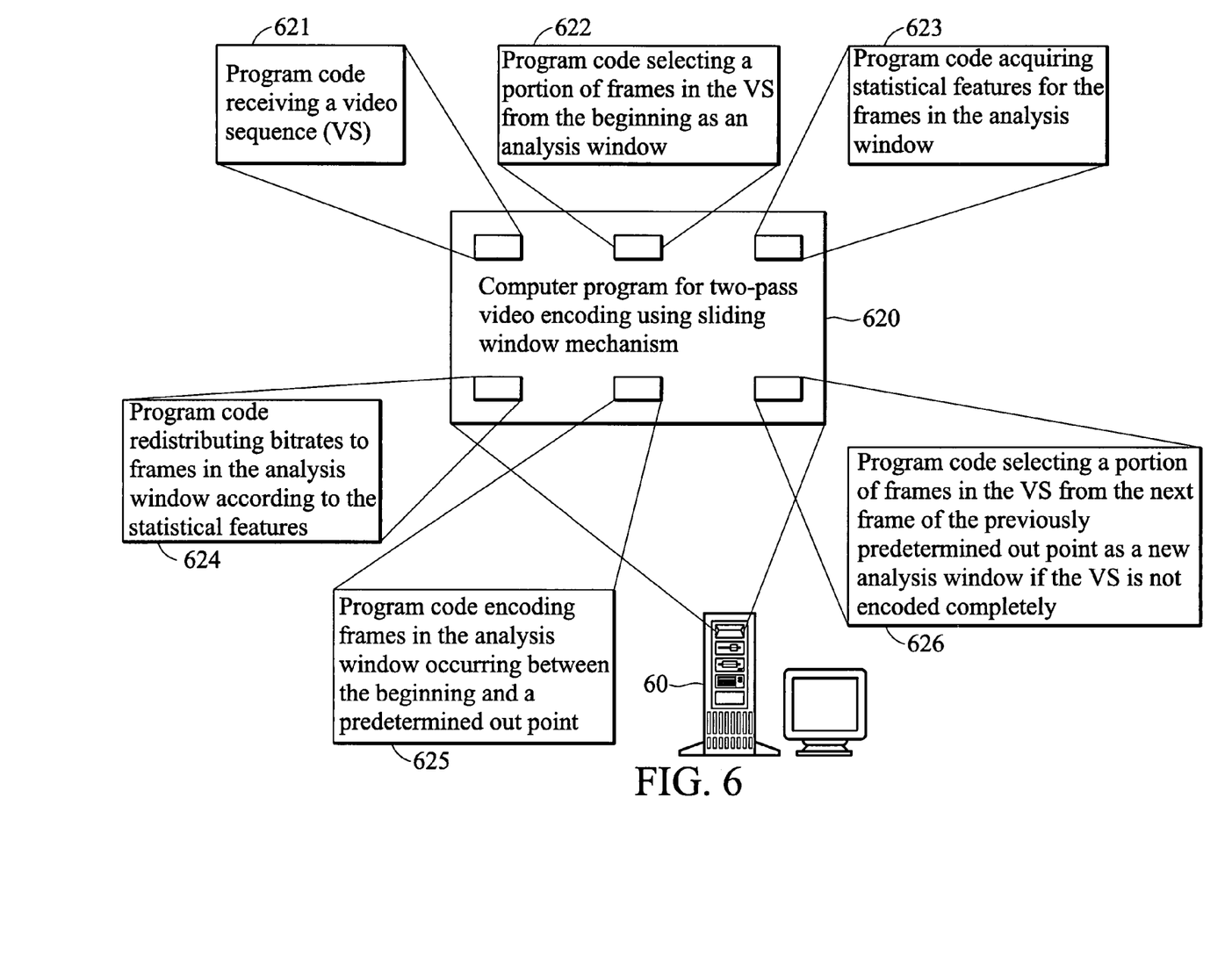
FIG. 6 is a diagram of a storage medium for a computer program providing the method of two-pass video encoding using sliding windows according to the preferred embodiment of the invention.

The invention additionally discloses a storage medium for storing a computer program providing the disclosed method of two-pass video encoding using sliding windows, as shown in FIG. 6. The computer program product includes a storage medium 60 having computer readable program code embodied in the medium for use in a computer system, the computer readable program code comprising at least computer readable program code 621 receiving a video sequence, computer readable program code 622 selecting a portion of frames in the video sequence from the beginning as an analysis window, computer readable program code 623 encoding frames in the analysis window to acquire statistical features, computer readable program code 624 distributing bitrates to frames in the analysis window according to the statistical features, computer readable program code 625 encoding frames in the analysis window occurring between the beginning and a predetermined out point and computer readable program code 626 selecting a portion of frames in the video sequence from the next frame of the previously predetermined out point as a new analysis window if the video sequence is not encoded completely.

The methods and system of the present invention, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Although the present invention has been described in its preferred embodiments, it is not intended to limit the invention to the precise embodiments disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A method for two-pass video encoding using sliding windows, the method comprising using a computer performing the steps of:
   receiving a video sequence (VS);
   selecting a portion of frames in the VS as a first analysis window;
   encoding each frame in the first analysis window to acquire a plurality of first statistical features;
   redistributing a first revised bitrate to each frame in the first analysis window according to the first statistical features using a variable bitrate (VBR) distribution method;
   encoding the frames in the first analysis window occurring between the beginning and a first out point according to the first revised bitrates, where the first out point is a frame located between the beginning and the last frames of the first analysis window;
   selecting a portion of frames in the VS from the next frame of the first out point as a second analysis window;
   encoding each frame in the second analysis window to acquire a plurality of second statistical features;
   redistributing a second revised bitrate to each frame in the second analysis window according to the second statistical features using the VBR distribution method; and
   encoding the frames in the second analysis window occurring between the beginning and a second out point according to the second revised bitrates, where the second out point is a frame located between the beginning and the last frames of the second analysis window.

2. The method as claimed in claim 1 wherein the number of frames in the first or second analysis window is larger than 900.

3. The method as claimed in claim 1 wherein the first or second statistical features comprises a plurality of quantization scales individually for a macro block (MB), and an original bitrate.

4. The method as claimed in claim 3 wherein the VBR distribution method utilizes an equation, $$BR2(i) = BR1(i) \times \sqrt{Qavg(i)} \times BRtarget \times Fwindow \div FR \div \sum_{j=1}^{Fwindow} \left( BR1(j) \times \sqrt{Qavg(j)} \right),$$

BR2(i) representing the revised bitrate of the (i)th frame, BR1(i) representing the original bitrate of the (i)th frame in the statistical features, $\sqrt{Qavg(i)}$ is a square root of an average of the quantization scales for the (i)th frame in the statistical feature, BRtarget representing a predetermined target bitrate, Fwindow representing a sum of frames in the analysis window and FR representing a predetermined frame rate indicating how many frames that one second of video plays.

5. The method as claimed in claim 1 wherein the VBR distribution method utilizes an equation, $$BR2(i) = BR1(i) \times \sqrt{Qavg(i)} \times BRtarget \times Fwindow \div FR \div \sum_{j=1}^{Fwindow} \left( BR1(j) \times \sqrt{Qavg(j)} \right),$$

BR2(i) representing the revised bitrate of the (i)th frame, BR1(i) representing an original bitrate of the (i)th frame in the statistical features, $\sqrt{Qavg(i)}$ is a square root of an average of a plurality of quantization scales for the (i)th frame in the statistical feature, BRtarget representing a predetermined target bitrate, Fwindow representing a sum of frames in the analysis window and FR representing a predetermined frame rate indicating how many frames that one second of video plays.

6. The method as claimed in claim 1 wherein the first or second out point is located in the ½ to ¾ length of the first or second analysis window from the beginning.

7. A system for two-pass video encoding using sliding windows, comprising:
   a sliding window control module, configured to receive a video sequence (VS), select a portion of frames in the VS as a first analysis window, select a portion of frames from the first analysis window occurring between the beginning and a first out point as a first encode window, select a portion of frames in the VS from the next frame of the first out point as a second analysis window, and select a portion of frames from the second analysis window occurring between the beginning and a second out point as a second encode window when the VS is not completely encoded, wherein the first out point is a frame located between the beginning and the last frames of the first analysis window, and the second out point is a frame located between the beginning and the last frames of the second analysis window;
   a statistical feature calculation module, configured to receive the first analysis window, encode each frame in the first analysis window to acquire a plurality of first statistical features, and receive the second analysis window to acquire a plurality of second statistical features;
   a bitrate redistribution module, configured to redistribute a first revised bitrate for each frame in the first analysis window according to the first statistical features using a variable bitrate (VBR) distribution method, redistribute a second revised bitrate for each frame in the second analysis window according to the second statistical features using the VBR distribution method; and
   a VBR encoding module, configured to encode the frames in the first encode window according to the first revised bitrates, and encode the frames in the second encode window according to the second revised bitrates.

8. The system as claimed in claim 7 wherein the number of frames in the first or second analysis window is larger than 900.

9. The system as claimed in claim 7 wherein the first or second statistical features comprises a plurality of quantization scales individually for a macro block (MB), and an original bitrate.

10. The system as claimed in claim 9 wherein the VBR distribution method utilizes an equation, $$BR2(i) = BR1(i) \times \sqrt{Qavg(i)} \times BRtarget \times Fwindow \div FR \div \sum_{j=1}^{Fwindow} \left(BR1(j) \times \sqrt{Qavg(j)}\right),$$

BR2(i) representing the revised bitrate of the (i)th frame, BR1(i) representing the original bitrate of the (i)th frame in the statistical features, $\sqrt{Qavg(i)}$ is a square root of an average of the quantization scales for the (i)th frame in the statistical feature, BRtarget representing a predetermined target bitrate, Fwindow representing a sum of frames in the analysis window and FR representing a predetermined frame rate indicating how many frames that one second of video plays.

11. The system as claimed in claim 7 wherein the VBR distribution method utilizes an equation, $$BR2(i) = BR1(i) \times \sqrt{Qavg(i)} \times BRtarget \times Fwindow \div FR \div \sum_{j=1}^{Fwindow} \left(BR1(j) \times \sqrt{Qavg(j)}\right),$$

BR2(i) representing the revised bitrate of the (i)th frame, BR1(i) representing an original bitrate of the (i)th frame in the statistical features, $\sqrt{Qavg(i)}$ is a square root of an average of a plurality of quantization scales for the (i)th frame in the statistical feature, BRtarget representing a predetermined target bitrate, Fwindow representing a sum of frames in the analysis window and FR representing a predetermined frame rate indicating how many frames that one second of video plays.

12. The system as claimed in claim 7 wherein the first or second out point is located in the ½ to ¾ length of the first or second analysis window from the beginning.

13. A computer-readable storage medium for storing a computer program which when executed performs a method of two-pass video encoding using sliding windows, the method comprising the steps of:
receiving a video sequence (VS);
selecting a portion of frames in the VS as a first analysis window;
encoding each frame in the first analysis window to acquire a plurality of first statistical features;
redistributing a first revised bitrate to each frame in the first analysis window according to the first statistical features using a variable bitrate (VBR) distribution method;
encoding the frames in the first analysis window occurring between the beginning and a first out point according to the first revised bitrates where the first out point is a frame located between the beginning and the last frames of the first analysis window;
selecting a portion of frames in the VS from the next frame of the first out point as a second analysis window;
encoding each frame in the second analysis window to acquire a plurality of second statistical features;
redistributing a second revised bitrate to each frame in the second analysis window according to the second statistical features using the VBR distribution method; and
encoding the frames in the second analysis window occurring between the beginning and a second out point according to the second revised bitrates, where the second out point is a frame located between the beginning and the last frames of the second analysis window.

14. The computer-readable storage medium as claimed in claim 13 wherein the number of frames in the first or second analysis window is larger than 900.

15. The computer-readable storage medium as claimed in claim 13 wherein the first or second statistical features comprises a plurality of quantization scales individually for a macro block (MB), and an original bitrate.

16. The computer-readable storage medium as claimed in claim 15 wherein the VBR distribution method utilizes an equation, $$BR2(i) = BR1(i) \times \sqrt{Qavg(i)} \times BRtarget \times Fwindow \div FR \div \sum_{j=1}^{Fwindow} \left(BR1(j) \times \sqrt{Qavg(j)}\right),$$

BR2(i) representing the revised bitrate of the (i)th frame, BR1(i) representing the original bitrate of the (i)th frame in the statistical features, $\sqrt{Qavg(i)}$ is a square root of an average of the quantization scales for the (i)th frame in the statistical feature, BRtarget representing a predetermined target bitrate, Fwindow representing a sum of frames in the analysis window and FR representing a predetermined frame rate indicating how many frames that one second of video plays.

17. The computer-readable storage medium of claim 13 wherein the VBR distribution method utilizes an equation, $$BR2(i) = BR1(i) \times \sqrt{Qavg(i)} \times BRtarget \times Fwindow \div FR \div \sum_{j=1}^{Fwindow} \left(BR1(j) \times \sqrt{Qavg(j)}\right),$$

BR2(i) representing the revised bitrate of the (i)th frame, BR1(i) representing an original bitrate of the (i)th frame in the statistical features, $\sqrt{Qavg(i)}$ is a square root of an average of a plurality of quantization scales for the (i)th frame in the statistical feature, BRtarget representing a predetermined target bitrate, Fwindow representing a sum of frames in the analysis window and FR representing a predetermined frame rate indicating how many frames that one second of video plays.

18. The computer-readable storage medium as claimed in claim 13 wherein the first or second out point is located in the ½ to ¾ length of the first or second analysis window from the beginning.

* * * * *